United States Patent
Ichikawa et al.

(10) Patent No.: US 9,921,585 B2
(45) Date of Patent: Mar. 20, 2018

(54) DETAILED MAP FORMAT FOR AUTONOMOUS DRIVING

(71) Applicant: Toyota Motor Engineering & Manufacturing North America, Inc., Erlanger, KY (US)

(72) Inventors: Kentaro Ichikawa, Shizuoke-prefecture (JP); Michael J. Delp, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/176,903

(22) Filed: Jun. 8, 2016

(65) Prior Publication Data

US 2016/0282879 A1    Sep. 29, 2016

Related U.S. Application Data

(63) Continuation of application No. 14/301,079, filed on Jun. 10, 2014, now abandoned, which is a
(Continued)

(51) Int. Cl.
*G01C 21/00* (2006.01)
*G08G 1/123* (2006.01)
(Continued)

(52) U.S. Cl.
CPC ........... *G05D 1/0276* (2013.01); *G01C 21/32* (2013.01); *G01C 21/3658* (2013.01); *G05D 1/0231* (2013.01); *G08G 1/095* (2013.01)

(58) Field of Classification Search
CPC ........ G08G 1/095; G08G 1/081; G08G 1/167; B60W 2550/22; B60W 30/10;
(Continued)

(56) References Cited

U.S. PATENT DOCUMENTS 3,613,073 A * 10/1971 Clift .................. G08G 1/08
                                                      340/920
4,704,610 A * 11/1987 Smith ................ G08G 1/087
                                                      340/906

(Continued)

FOREIGN PATENT DOCUMENTS

EP    1498694 A2    1/2005
EP    1909247 A1    4/2008
(Continued)

OTHER PUBLICATIONS

Extended European Search Report, European Patent Application No. EP15166003.2, dated Jul. 16, 2015 (7 pages).
(Continued)

*Primary Examiner* — Khoi H Tran
*Assistant Examiner* — Jorge O Peche
(74) *Attorney, Agent, or Firm* — Christopher G. Darrow; Darrow Mustafa PC

(57) ABSTRACT

A computer-readable detailed map format is disclosed. The map format can be used in the operation of an autonomous vehicle. The detailed map format includes a plurality of lane segments and a plurality of lane links. Each of the lane links can extend between two lane segments across a traffic intersection. Each of the lane links can also be associated with one of a plurality of traffic signals. A transition rule is associated with a first lane link and based on information associated with the one of the plurality of traffic signals associated with the first lane link. An interlock rule can be based on information associated with the one of the plurality of traffic signals associated with a second lane link. The first lane link and second lane link can be associated with different traffic signals and can extend between different lane segments across the traffic intersection.

21 Claims, 4 Drawing Sheets

Related U.S. Application Data continuation-in-part of application No. 14/265,370, filed on Apr. 30, 2014, now abandoned.

(51) Int. Cl.
  *G05D 1/02* (2006.01)
  *G01C 21/36* (2006.01)
  *G01C 21/32* (2006.01)
  *G08G 1/095* (2006.01)

(58) Field of Classification Search
  CPC ............ G01C 21/3629; G01C 21/3644; G01C 21/3667; G01C 21/32; G01C 21/3658; G01C 21/367; G01C 21/26; G06K 9/00825; H04W 4/046
  See application file for complete search history.

(56) References Cited

U.S. PATENT DOCUMENTS

| | | | | |
|---|---|---|---|---|
| 4,775,865 A * | 10/1988 | Smith | ............... | G08G 1/087 340/906 |
| 4,884,072 A * | 11/1989 | Horsch | ............... | G08G 1/0175 340/937 |
| 5,041,828 A * | 8/1991 | Loeven | ............... | G08G 1/0175 340/936 |
| 5,278,554 A * | 1/1994 | Marton | ............... | G08G 1/081 340/909 |
| 5,798,949 A * | 8/1998 | Kaub | ............... | G08G 1/164 703/6 |
| 5,801,646 A * | 9/1998 | Pena | ............... | G08G 1/0965 340/331 |
| 5,873,674 A * | 2/1999 | Hohl | ............... | E01F 9/573 404/10 |
| 5,926,126 A | 7/1999 | Engelman | | |
| 6,148,370 A | 11/2000 | Kobayashi | | |
| 6,230,098 B1 | 5/2001 | Ando et al. | | |
| 6,232,889 B1 * | 5/2001 | Apitz | ............... | G08G 1/087 340/902 |
| 6,253,128 B1 | 6/2001 | Kageyama et al. | | |
| 6,317,058 B1 * | 11/2001 | Lemelson | ............... | G08G 1/07 340/905 |
| 6,338,021 B1 * | 1/2002 | Yagyu | ............... | G01C 21/3461 340/990 |
| 6,405,132 B1 | 6/2002 | Breed et al. | | |
| 6,418,371 B1 * | 7/2002 | Arnold | ............... | G08G 1/08 340/905 |
| 6,526,352 B1 | 2/2003 | Breed et al. | | |
| 6,919,823 B1 * | 7/2005 | Lock | ............... | G08G 1/0175 340/916 |
| 7,433,889 B1 | 10/2008 | Barton | | |
| 7,477,988 B2 | 1/2009 | Dorum | | |
| 8,000,897 B2 | 8/2011 | Breed et al. | | |
| 8,121,749 B1 * | 2/2012 | Agrawal | ............... | G06Q 10/047 701/23 |
| 8,209,120 B2 | 6/2012 | Breed | | |
| 8,527,199 B1 | 9/2013 | Burnette et al. | | |
| 8,712,624 B1 * | 4/2014 | Ferguson | ........ | B60W 30/18154 701/117 |
| 8,761,991 B1 * | 6/2014 | Ferguson | ............... | G05D 1/0088 340/917 |
| 8,855,904 B1 * | 10/2014 | Templeton | ........... | G08G 1/0112 340/988 |
| 8,917,190 B1 * | 12/2014 | Melvin | ............... | G08G 1/095 340/905 |
| 2001/0025528 A1 | 10/2001 | Blew et al. | | |
| 2002/0198632 A1 | 12/2002 | Breed et al. | | |
| 2003/0016143 A1 * | 1/2003 | Ghazarian | ............... | G08G 1/017 340/901 |
| 2005/0060069 A1 | 3/2005 | Breed et al. | | |
| 2005/0134440 A1 | 6/2005 | Breed | | |
| 2005/0137786 A1 | 6/2005 | Breed et al. | | |
| 2005/0200467 A1 | 9/2005 | Au et al. | | |
| 2005/0273261 A1 | 12/2005 | Niwa et al. | | |
| 2006/0184321 A1 * | 8/2006 | Kawakami | ............... | G01C 21/28 701/411 |
| 2006/0224303 A1 * | 10/2006 | Hayashi | ............... | G01C 21/3629 701/431 |
| 2007/0005609 A1 | 1/2007 | Breed | | |
| 2007/0021912 A1 * | 1/2007 | Morita | ............... | G01C 21/12 701/431 |
| 2007/0021915 A1 | 1/2007 | Breed et al. | | |
| 2007/0091173 A1 | 4/2007 | Kade et al. | | |
| 2007/0109111 A1 | 5/2007 | Breed et al. | | |
| 2007/0152804 A1 | 7/2007 | Breed et al. | | |
| 2007/0200730 A1 * | 8/2007 | Kang | ............... | G08G 1/095 340/907 |
| 2007/0296610 A1 * | 12/2007 | Heffernan | ............... | G08G 1/095 340/932 |
| 2008/0012726 A1 * | 1/2008 | Publicover | ............... | G08G 1/095 340/932 |
| 2008/0015771 A1 | 1/2008 | Breed et al. | | |
| 2008/0040023 A1 | 2/2008 | Breed et al. | | |
| 2008/0040029 A1 | 2/2008 | Breed | | |
| 2008/0042815 A1 | 2/2008 | Breed et al. | | |
| 2008/0097689 A1 * | 4/2008 | Germanos | ............... | G01C 21/20 701/467 |
| 2008/0106436 A1 | 5/2008 | Breed | | |
| 2008/0133136 A1 | 6/2008 | Breed et al. | | |
| 2008/0140318 A1 | 6/2008 | Breed | | |
| 2008/0147253 A1 | 6/2008 | Breed | | |
| 2008/0150786 A1 | 6/2008 | Breed | | |
| 2008/0154629 A1 | 6/2008 | Breed et al. | | |
| 2008/0162027 A1 * | 7/2008 | Murphy | ............... | B60W 50/14 701/117 |
| 2008/0172171 A1 * | 7/2008 | Kowalski | ............... | G08G 1/065 701/118 |
| 2008/0238720 A1 * | 10/2008 | Lee | ............... | G08G 1/081 340/909 |
| 2008/0284616 A1 * | 11/2008 | Rendon | ............... | G08G 1/07 340/907 |
| 2008/0291052 A1 * | 11/2008 | Burns | ............... | G08G 1/164 340/903 |
| 2009/0030605 A1 | 1/2009 | Breed | | |
| 2009/0043506 A1 | 2/2009 | Breed | | |
| 2009/0135024 A1 * | 5/2009 | Park | ............... | G08G 1/095 340/929 |
| 2009/0312888 A1 * | 12/2009 | Sickert | ............... | G08G 1/0962 701/1 |
| 2009/0326751 A1 * | 12/2009 | Otake | ............... | B60T 7/22 701/25 |
| 2010/0002911 A1 | 1/2010 | Wu et al. | | |
| 2010/0017060 A1 | 1/2010 | Zhang et al. | | |
| 2010/0020170 A1 | 1/2010 | Higgins-Luthman et al. | | |
| 2010/0026804 A1 | 2/2010 | Tanizaki et al. | | |
| 2010/0073194 A1 * | 3/2010 | Ghazarian | ............... | G08G 1/017 340/901 |
| 2010/0262359 A1 | 10/2010 | Motoyama | | |
| 2010/0312527 A1 | 12/2010 | Weiland et al. | | |
| 2011/0006915 A1 * | 1/2011 | Sower | ............... | G08G 1/095 340/907 |
| 2011/0015850 A1 | 1/2011 | Tange et al. | | |
| 2011/0025528 A1 * | 2/2011 | Rejali | ............... | G08G 1/08 340/905 |
| 2011/0080303 A1 * | 4/2011 | Goldberg | ............... | G08G 1/07 340/909 |
| 2011/0118900 A1 | 5/2011 | Uchida et al. | | |
| 2011/0182473 A1 * | 7/2011 | Wang | ............... | G08G 1/04 382/103 |
| 2011/0187559 A1 * | 8/2011 | Applebaum | ............... | B60Q 1/00 340/907 |
| 2012/0095646 A1 * | 4/2012 | Ghazarian | ............... | G01S 19/17 701/36 |
| 2012/0098678 A1 | 4/2012 | Rathmacher et al. | | |
| 2012/0101712 A1 | 4/2012 | Schramm et al. | | |
| 2012/0112927 A1 * | 5/2012 | Grieco | ............... | G08G 1/04 340/906 |
| 2012/0123640 A1 * | 5/2012 | Mukaiyama | ............... | G08G 1/015 701/36 |
| 2012/0209505 A1 | 8/2012 | Breed et al. | | |

(56) References Cited

U.S. PATENT DOCUMENTS

| | | | |
|---|---|---|---|
| 2012/0323474 A1 | 12/2012 | Breed et al. | |
| 2013/0018572 A1* | 1/2013 | Jang | G08G 1/164 701/119 |
| 2013/0038433 A1* | 2/2013 | Ullrich | G08G 1/161 340/425.5 |
| 2013/0080019 A1 | 3/2013 | Isaji et al. | |
| 2013/0245945 A1* | 9/2013 | Morita | G08G 1/096716 701/533 |
| 2013/0304322 A1 | 11/2013 | Isaji et al. | |
| 2013/0335238 A1* | 12/2013 | Matsur | G08G 1/08 340/906 |
| 2014/0200798 A1* | 7/2014 | Huelsen | G08G 1/09626 701/300 |
| 2014/0257659 A1 | 9/2014 | Dariush | |
| 2015/0105989 A1* | 4/2015 | Lueke | B60W 30/00 701/70 |
| 2015/0124096 A1* | 5/2015 | Koravadi | G06K 9/00825 348/148 |
| 2015/0266508 A1 | 9/2015 | Yoshihata et al. | |
| 2015/0339533 A1 | 11/2015 | Liu et al. | |
| 2016/0221575 A1 | 8/2016 | Posch et al. | |
| 2016/0318490 A1* | 11/2016 | Ben Shalom | B60T 7/12 |
| 2017/0110010 A1* | 4/2017 | Grabs | G08G 1/0129 |

FOREIGN PATENT DOCUMENTS

| | | | | |
|---|---|---|---|---|
| EP | 2466566 A1 * | 6/2012 | | G08G 1/07 |
| EP | 2466566 A1 * | 6/2012 | | G08G 1/07 |
| JP | 2002333829 A | 11/2002 | | |
| JP | 2003315056 A | 11/2003 | | |
| JP | 2007086156 A | 4/2007 | | |
| JP | 2007278813 A | 10/2007 | | |
| JP | 2009015504 A | 1/2009 | | |
| JP | 2009199572 A | 9/2009 | | |
| JP | 2010026875 A | 2/2010 | | |
| WO | 2012163573 A1 | 12/2012 | | |
| WO | WO 2012163573 A1 * | 12/2012 | | G08G 1/09626 |
| WO | WO-2012163573 A1 * | 12/2012 | | G08G 1/09626 |
| WO | 2013060925 A1 | 5/2013 | | |

OTHER PUBLICATIONS

Geographic Data Filed—GDF, Presentations, Articles, Publications/Documents/Handouts, retrieved from the Internet: < https://web.archive.org/web/*/http://www.ertico.com/assets/download/GDF/handouts.pdf>, website <http://www.ertico.com/assets/download/GDF/handouts.pdf> last archived Apr. 1, 2014 (41 pages).

OpenStreetMap Wiki, retrieved from the Internet: <http://wiki.openstreetmap.org/wiki/Main_Page>, retrieved Feb. 19, 2016 (3 pages).

Czerwionka et al., "Optimized Route Network Graph as Map Reference for Autonomous Cars Operating on German Autobahn", Artificial Intelligence Group Institute of Computer Science freie Universitat Berlin, Germany (6 pages).

Cen Technical Committee 278 Road Transport and Traffic Telematics. (1995). Geographic Data Files. Nederlands Normalisatie Instituut. p. 42 available at: http://www.ertico.com/assets/download/GDF/TOC1-5.pdf (1 page).

Kiwi-W Consortium. (2001). Outline of Kiwi Format. Slide 20, information available at http://www.kiwi-w.org/documents_eng.html (1 page).

International Search Report and Written Opinion for International Application No. PCT/US2015/027347, dated Jul. 23, 2015 (12 pages).

* cited by examiner

DETAILED MAP FORMAT FOR AUTONOMOUS DRIVING

CROSS-REFERENCE TO RELATED APPLICATIONS

This application is a continuation of U.S. application Ser. No. 14/301,079, filed Jun. 10, 2014, which is a continuation-in-part of U.S. application Ser. No. 14/265,370, filed Apr. 30, 2014, both of which are hereby incorporated by reference in their entirety.

BACKGROUND

Fully or highly automated, e.g. autonomous or self-driven, driving systems are designed to operate a vehicle on the road either without or with low levels of driver interaction or other external controls. Autonomous driving systems require certainty in the position of and distance to geographic features surrounding the vehicle with a sufficient degree of accuracy to adequately control the vehicle. Details about the road or other geographic features surrounding the vehicle can be recorded on a detailed virtual map. The more accurate the detailed virtual map, the better the performance of the autonomous driving system. Existing virtual maps do not include sufficient or sufficiently accurate geographic feature details for optimized autonomous operation.

Autonomous driving systems can also be programmed to follow transition rules, or traffic operation rules, associated with a traffic intersection when localized to (exactly positioned in respect to) the traffic intersection. Though an autonomous driving system can recognize and implement some transition rules by observing traffic signals along the a navigation route of the autonomous vehicle, information related to additional traffic signals and the associated actions of other vehicles within the traffic intersection can improve the performance of the autonomous driving system.

SUMMARY

The detailed map format described here can improve operation of a highly-automated or autonomous vehicle at traffic intersections by improving both localization (exact positioning) and control over the vehicle. The detailed map format can include lane segments associated with branches of a traffic intersection and lane links that indicate the transition path between the lane segments across the traffic intersection. Each of the lane links can be associated with transition rules governing the action of the autonomous vehicle based on the state of detected traffic signals. Each of the transition rules can be further associated with interlock rules that provide assumptions regarding the actions of other vehicles through the traffic intersection as based on the state of traffic signals that are not directly detected by the autonomous vehicle.

In one respect, the subject matter described herein is directed to a method of operating an autonomous vehicle approaching a traffic intersection. The method can include determining a current location of the autonomous vehicle. The method can include acquiring driving environment data using one or more sensors. The driving environment data can include information about a traffic signal associated with a current travel lane of the autonomous vehicle. The method can include inputting the acquired driving environment data into a computer readable map format of the traffic intersection.

The map format can include a plurality of lane segments. Each lane segment can be associated with a branch of the traffic intersection. The map format can include a plurality of lane links. Each lane link can be associated with two of the plurality of lane segments and extending between two of the branches of the traffic intersection. The map format can include a plurality of traffic signals. Each traffic signal can be associated with at least one of the plurality of lane links. The map format can include a transition rule associated with a first lane link. The transition rule can be based on information associated with the one of the plurality of traffic signals associated with the first lane link. The map format can include an interlock rule based on information associated with the one of the plurality of traffic signals associated with a second lane link. Inputting the acquired driving environment data can include inputting the detected information about the traffic signal with the one of the plurality of traffic signals associated with the first lane link, and applying the interlock rule based on the detected information about the traffic signal associated with the one of the plurality of traffic signals associated with the second lane link.

The method can include determining a driving maneuver for the autonomous vehicle relative to the traffic intersection using the map format and the determined current location of the autonomous vehicle. The method can include causing the autonomous vehicle to implement the determined driving maneuver.

In another respect, the subject matter described herein is directed to an autonomous vehicle system. The system can include one or more sensors configured to determine a current location of the autonomous vehicle and to acquire driving environment data using one or more sensors. The driving environment data can include information about a traffic signal associated with a current travel lane of the autonomous vehicle sense the external environment of the vehicle. The system can include a processing unit. The one or more sensors can be communicatively coupled to the processing unit. The system can include a memory communicatively coupled to the processing unit.

The memory can include a computer-readable map format. The map format can include a plurality of lane segments. Each lane segment can be associated with a branch of a traffic intersection. The map format can include a plurality of lane links. Each lane link can be associated with two of the plurality of lane segments and can extend between two of the branches of the traffic intersection. The map format can include a plurality of traffic signals. Each traffic signal can be associated with at least one of the plurality of lane links. The map format can include a transition rule associated with a first lane link. The transition rule can be based on information associated with the one of the plurality of traffic signals associated with the first lane link. The map format can include an interlock rule based on information associated with the one of the plurality of traffic signals associated with a second lane link.

The processing unit can be configured to input the acquired driving environment data into the computer readable map format of the traffic intersection. Inputting the acquired driving environment data can include inputting the detected information about the traffic signal with the one of the plurality of traffic signals associated with the first lane link, and applying the interlock rule based on the detected information about the traffic signal associated with the one of the plurality of traffic signals associated with the second lane link. The processing unit can be configured to determine a driving maneuver for the autonomous vehicle relative to the traffic intersection using the map format and the determined current location of the autonomous vehicle. The processing unit can be configured to cause the autonomous vehicle to implement the determined driving maneuver.

BRIEF DESCRIPTION OF THE DRAWINGS

The description herein makes reference to the accompanying drawings wherein like reference numerals refer to like parts throughout the several views, and wherein.

DETAILED DESCRIPTION

A computer-readable, highly detailed map format for an autonomous vehicle is disclosed. The detailed map format includes information representing the geographical location, travel direction, and speed limit of lanes on a road using lane segments formed of waypoints. Beyond this basic information, the detailed map format also includes lane links that represent transitions between lane segments across traffic intersections, transition rules based on the state of detected traffic signals that govern the actions of the autonomous vehicle across lane links, and interlock rules based on the inferred state of undetected traffic signals that would govern the actions of other vehicles across different lane links. The use of lane links, transition rules, and interlock rules within a detailed map formant can greatly improve the performance of an autonomous driving system.

Figure 1:
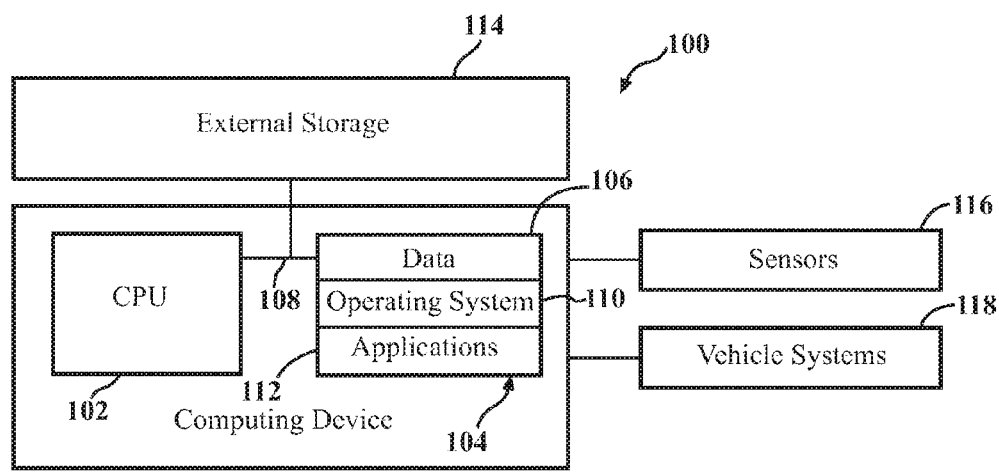
FIG. 1 is a block diagram of a computing device.

FIG. 1 is a block diagram of a computing device 100, for example, for use with the autonomous driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform automated driving methods using the detailed map format described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with one or more sensors 116. The sensors 116 can capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle for use in creating a detailed map format as described below, including information specific to objects such as features of the route being travelled by the vehicle or other localized position data and/or signals and outputting corresponding data and/or signals to the CPU 102.

In the examples described below, the sensors 116 can capture, at least, signals for a GNSS or other system that determines vehicle position and velocity and data for a LIDAR system or other system that measures vehicle distance from lane lines (e.g., route surface markings or route boundaries), obstacles, objects, or other environmental features including traffic lights and road signs. The computing device 100 can also be in communication with one or more vehicle systems 118, such as vehicle braking systems, vehicle propulsions systems, etc. The vehicle systems 118 can also be in communication with the sensors 116, the sensors 116 being configured to capture data indicative of performance of the vehicle systems 118.

Figure 2:
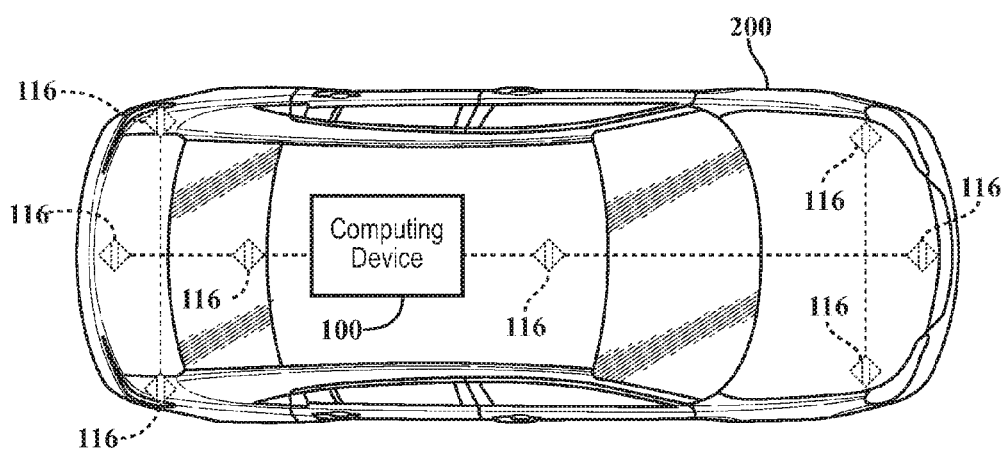
FIG. 2 is a schematic illustration of an autonomous vehicle including the computing device of FIG. 1.

FIG. 2 is a schematic illustration of an autonomous vehicle 200 including the computing device 100 of FIG. 1. The computing device 100 can be located within the vehicle 200 as shown in FIG. 2 or can be located remotely from the vehicle 200 in an alternate location (not shown). If the computing device 100 is located remotely from the vehicle 200, the vehicle 200 can include the capability of communicating with the computing device 100.

The vehicle 200 can also include a plurality of sensors, such as the sensors 116 described in reference to FIG. 1. One or more of the sensors 116 shown can be configured to capture the distance to objects within the surrounding environment for use by the computing device 100 to estimate position and orientation of the vehicle 200, images for processing by an image sensor, vehicle position in global coordinates based on signals from a plurality of satellites, or any other data and/or signals that could be used to determine the current state of the vehicle or determine the position of the vehicle 200 in respect to its environment for use in either creating a detailed map format or comparing the vehicle's 200 position to the detailed map format. Recognized geographic features such as those described below can be used to build a detailed map format, and objects such as other vehicles can be recognized and excluded from the detailed map format.

Map formats can be constructed using geographic features captured by the vehicle 200 such as lane lines and curbs proximate the vehicle 200 as it travels a route. These geographic features can be captured using the above described LIDAR system and/or cameras in combination with an algorithm such as random sample consensus (RANSAC) to find lines, record the position of the vehicle 200, and collect data on position from a GNSS and/or an IMU. The captured geographic features can then be manipulated using a simultaneous localization and mapping (SLAM) technique to position all of the geographic features in relation to the vehicle's 200 position. Some of the geographic features can be categorized as lane borders, and lane centers can be determined based on the lane borders. Alternatively, map formats can be constructed using overhead images (e.g. satellite images) of geographic features traced by a map editor that allows selection of different categories for each geographic feature.

Figure 3:
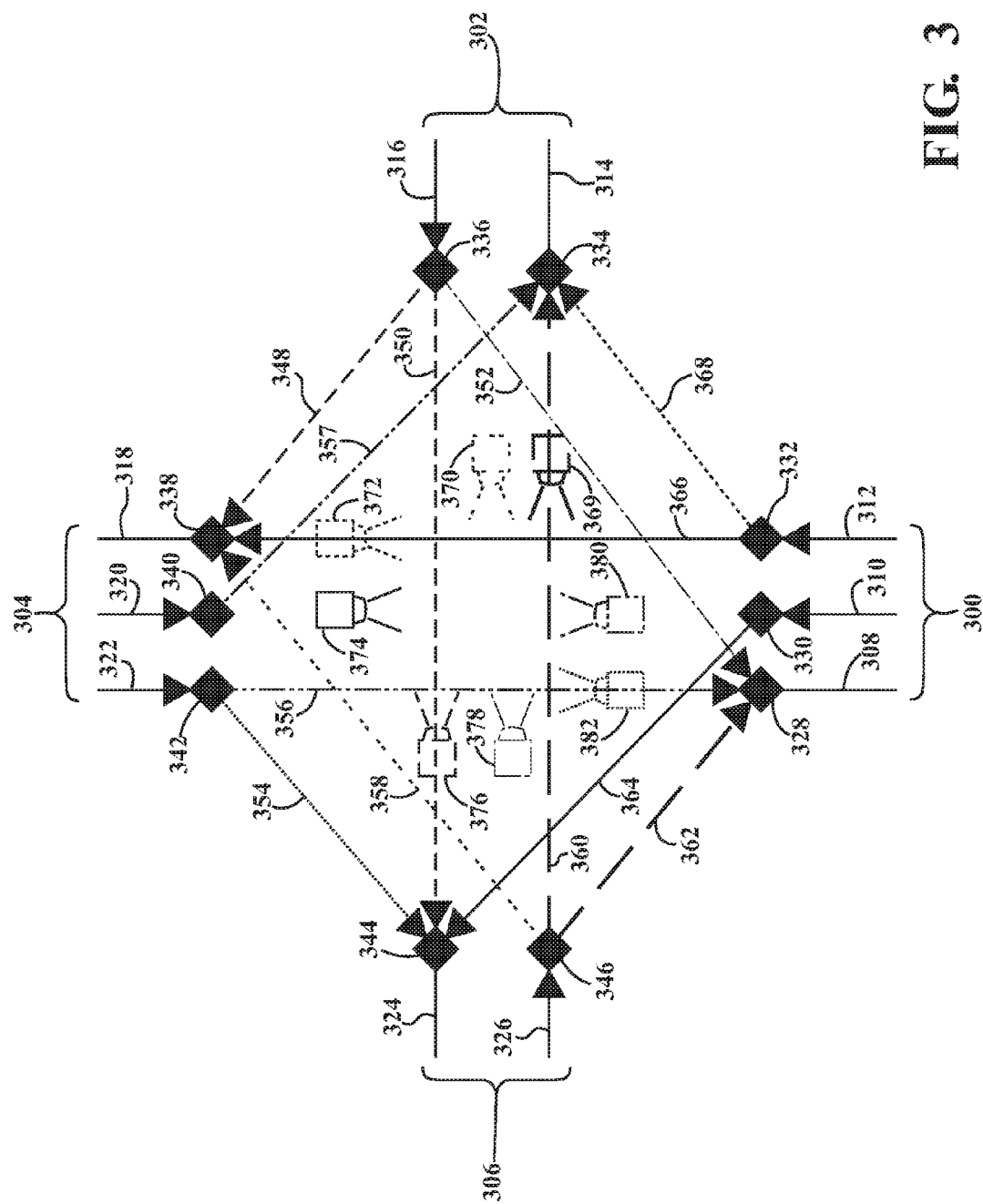
FIG. 3 shows an example two-dimensional representation of a portion of a four-way intersection as represented within a detailed map format for use with the autonomous vehicle of FIG. 2.

FIG. 3 shows an example two-dimensional representation of a portion of a four-way intersection as represented within a detailed map format for use with the autonomous vehicle 200 of FIG. 2. The intersection in this example map format includes four branches 300, 302, 304, 306. Each of the branches 300, 302, 304, 306 can include traffic lanes represented by portions of lane segments 308, 310, 312, 314, 316, 318, 320, 322, 324, 326. Each of the lane segments 308, 310, 312, 314, 316, 318, 320, 322, 324, 326 can end in a waypoint 328, 330, 332, 334, 336, 338, 340, 342, 344, 346 at the traffic intersection.

For example, the lane segment 308 extends from the waypoint 328 away from the intersection and the lane segment 310 extends to the waypoint 330 toward the intersection. Information can be associated with the waypoints 328, 330, 332, 334, 336, 338, 340, 342, 344, 346 and stored as part of the map format. For example, each waypoint 328, 330, 332, 334, 336, 338, 340, 342, 344, 346 can include information such as geographical location, lane speed, and lane direction. The map information associated with the lanes and intersection can be stored, for example, in the form of spline points or as curves with knot vectors in the memory 104 of the computing device 100 or can be available from a remote location.

In the example map format shown in FIG. 3, the lane segment 310 is shown as having a bottom-to-top direction by the arrow at the end of the lane segment 310 touching the waypoint 330 and the lane segment 316 is shown as having a right-to-left direction by the arrow at the end of the lane segment 316 touching the waypoint 336. The overall computer-readable map format can be stored in plain text, binary, or xml, for example. The basic map information can be gathered from a route network definition file (RNDF) or any other available source. However, this basic map information is not sufficient to operate the autonomous vehicle 200 safely through the traffic intersection.

Additional detail can be added to the map format in order to improve the map format for use with the autonomous vehicle 200. As shown in FIG. 3, a plurality of lane links 348, 350, 352, 354, 356, 357, 358, 360, 362, 364, 366, 368 can be included in the map format. Each of the lane links 348, 350, 352, 354, 356, 357, 358, 360, 362, 364, 366, 368 can be associated with two of the lane segments 308, 310, 312, 314, 316, 318, 320, 322, 324, 326 and can extend between two of the branches 300, 302, 304, 306 of the traffic intersection. For example, the lane link 352 extends between the lane segment 316 and the lane segment 308 and represents a left turn for the autonomous vehicle 200 from branch 302 of the traffic intersection to branch 300 of the traffic intersection. In another example, the lane link 350 extends between the lane segment 316 and the lane segment 324 and represents a pass straight through the traffic intersection from branch 302 to branch 306.

In addition to the lane links 348, 350, 352, 354, 356, 357, 358, 360, 362, 364, 366, 368, a plurality of traffic signals can be included in the map format. Each of the traffic signals can be associated with at least one of the lane links 348, 350, 352, 354, 356, 357, 358, 360, 362, 364, 366, 368 and information associated with the traffic signals can include a geographical location, a traffic signal type, and a traffic signal state. Traffic signal type can include information on the structure and orientation of a traffic light or traffic sign. Traffic signal structure and orientation for a traffic light can include "vertical three," "vertical three left arrow," "horizontal three," "right arrow," etc. Traffic signal state for a traffic light can include, for example, "green," "green arrow," "yellow," "blinking yellow," or "red."

In FIG. 3, each of the traffic signals shown is a traffic light 369, 370, 372, 374, 376, 378, 380, 382 having a "vertical three" structure and orientation. Each pair of traffic signals at each branch 300, 302, 304, 306 of the traffic intersection can be configured to have the same structure and orientation as well as the same state. In one example, the traffic light 376 can be associated both with the lane link 348 and the lane link 350. This relationship is shown by using the same pattern to display both the lane links 348, 350 and the traffic light 376 within the map format. Given the structure of the intersection and position of the traffic light 376 in reference to the lane segments 316, 318, 324, the lane link 348 is understood to indicate a right turn from the lane segment 316 to the lane segment 318 and the lane link 350 is understood to indicate a straight pass through the intersection from the lane segment 316 to the lane segment 324.

Similarly, the traffic light 378 can be associated with the lane link 352 and displayed as such using the same pattern in the map format. The lane link 352 is understood to indicate a left turn from the lane segment 316 to the lane segment 308. Both of the traffic lights 376, 378 directing traffic exiting branch 302 of the traffic intersection can have the same structure, orientation, and state at the same time. In one more example, the traffic light 382 can be associated with the lane link 354, where the lane link 354 represents a right turn from the lane segment 322 to the lane segment 324.

Figure 4:
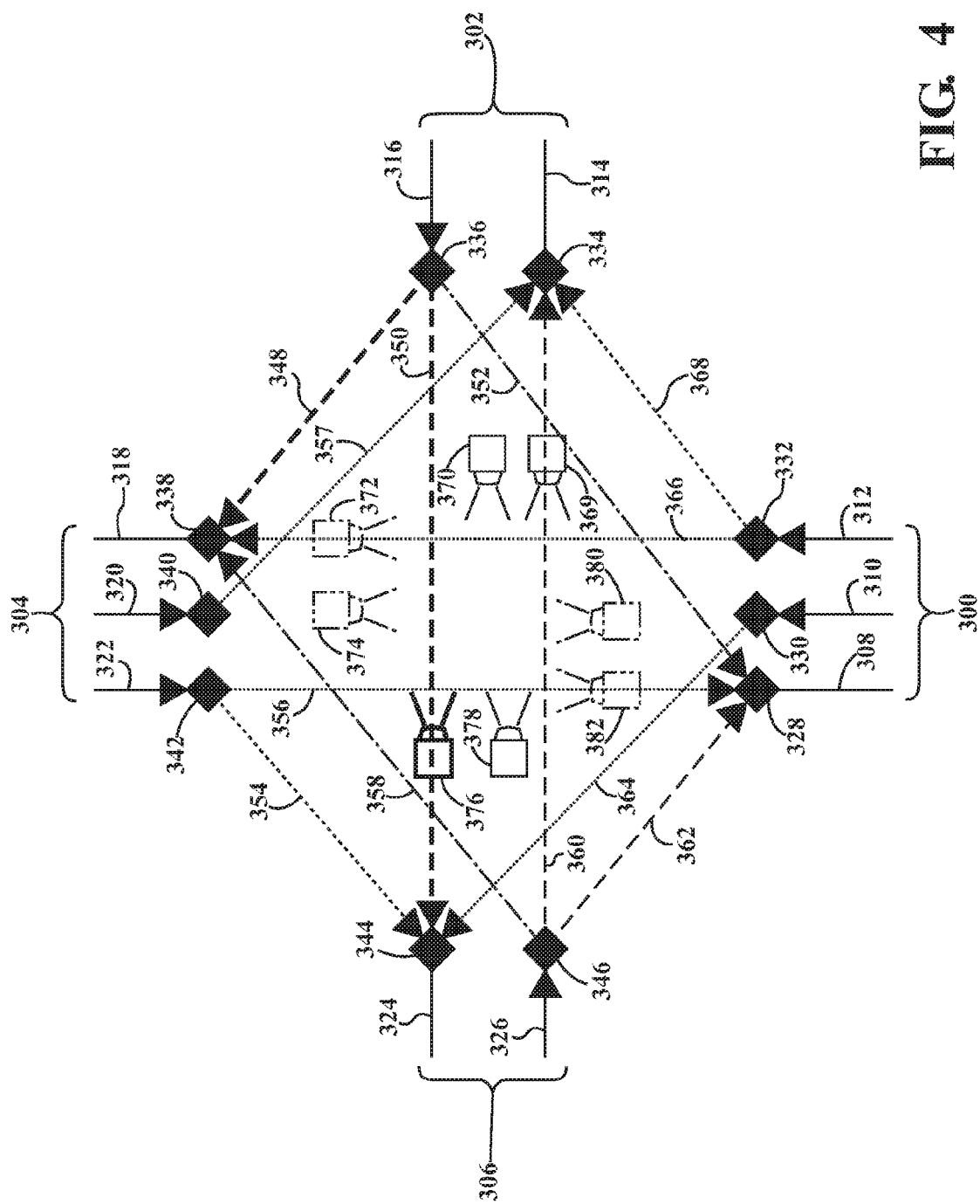
FIG. 4 shows the example two-dimensional representation of the portion of the four-way intersection of FIG. 3 including a representation of transition and interlock rules.

FIG. 4 shows the example two-dimensional representation of the portion of the four-way intersection of FIG. 3 including a representation of transition and interlock rules. Transition rules can be used to control the autonomous vehicle 200 to follow one of the lane links 348, 350, 352, 354, 356, 357, 358, 360, 362, 364, 366, 368 based on the state of at least one of the traffic signals and can be saved in the detailed map format. Example transition rules can include "stop," "prefer stop," "go," "stop and go," and "yield," with each of the transition rules indicating an available maneuver for either the autonomous vehicle 200 or any other vehicle approaching the four-way intersection.

As described in FIG. 3, the state of the traffic light 376 can govern the type of maneuver the autonomous vehicle 200 can undertake as associated with the lane links 348, 350. This governance is also reflected in FIG. 4. For example, a transition rule "go" is highlighted as associated with the lane links 348, 350 and can direct the autonomous vehicle 200 to either proceed straight through the intersection from the lane segment 316 to the lane segment 324 or proceed in a right turn through the intersection from the lane segment 316 to the lane segment 318 given the state of the traffic light 376 of "green."

This transition rule of "go" is represented within the map format using a first line type, a dashed line, in association with the lane links 348, 350. The "green" state of the traffic light 376 is also shown with a specific line type, in this case, a solid line, and can, for example, be detected by one or more of the sensors 116 disposed on the autonomous vehicle 200 when the autonomous vehicle 200 is located on lane segment 316. The lane links 348, 350 and the traffic light 376 are shown in a bold style to indicate that in the example of FIG. 4, the traffic light 376 is directly detected by the autonomous vehicle 200.

Though a transition rule can be based on the state of one of the traffic signals as directly detected by the autonomous vehicle 200 while navigating along a route, additional information regarding the transition of other vehicles through the traffic intersection would improve the performance of the automated driving system. Hence, the detailed map format has been improved to include interlock rules. Each interlock rule can be inferred from one of the transition rules governed by an interlocked traffic signal. An interlocked traffic signal refers to a traffic signal having a specific traffic signal state based on the traffic signal state of a different traffic signal.

For example, if the autonomous vehicle 200 is positioned along lane segment 316, the state of at least one of the traffic lights 376, 378 can be captured directly by the autonomous vehicle 200, for example, as "green." The state of the traffic lights 372, 374 can then be inferred to be "red," which is shown in the detailed map format using a different line style than the solid line used for the traffic lights 376, 378, since the traffic lights 372, 374 are interlocked traffic signals to the traffic lights 376, 378 given the structure of the traffic intersection. That is, if traffic is free to proceed from the branch 302 to the branch 306, traffic must not be allowed to proceed from the branch 300 to the branch 304 at the same time. Further, the transition rule "go" as associated with the lane links 348, 350 and the traffic light 376 when the state of the traffic light 376 is "green" leads to an inference of the interlock rule "stop" associated with the lane link 366 and the traffic light 374 based on the interlocked state of the traffic light 374 as "red."

In another example, the transition rule "go" associated with the lane links 348, 350 and the traffic light 376 indicating that the autonomous vehicle 200 can proceed either straight or right through the traffic intersection when the state of the traffic light 376 is "green" can lead to the inference of the interlock rule "stop" associated with the lane link 356 and the traffic light 380 indicating that another vehicle must stop at the traffic intersection at the end of the lane segment 322 and cannot proceed through the traffic intersection to the lane segment 308 since the state of the traffic light 380 is inferred to be "red" given the state of the traffic light 376 being "green." The interlock rule "stop" as associated with the traffic lights 374, 380 and the lane links 356, 366 and as inferred from the transition rule "go" as associated with the traffic light 376 and the lane links 348, 350 is shown in this example map format by using the same type of line to represent the lane links 356, 366, a closely spaced dotted line.

In the prior two examples, the lane links 348, 350 and the lane links 356, 366 are associated with different traffic signals, specifically, the traffic light 376 and the traffic lights 374, 380, and extend between different branches 300, 302, 304, 306 of the traffic intersection. Any number of interlock rules can be inferred from a given transition rule depending on the structure of the traffic intersection as detailed within the map format. In the example map format of FIG. 4, the lane links 348, 350, 360, 362 are all shown with the same line style. This line style is associated with the traffic light 376 having a "green" state, the lane links 348, 350 having "go" transition rules, the traffic light 369 having an interlocked "green" state, and the lane links 360, 362 having "go" interlock rules. That is, if the autonomous vehicle 200 is free to travel along the lane links 348, 350 given a "green" state for the traffic light 376, another vehicle would also be free to travel along the lane links 360, 362 based on an interlocked "green" state for the traffic light 369.

Another set of interlock rules represented in the example map format of FIG. 4 include "stop and go" interlock rules for the lane links 354, 368 based on the interlocked state of "red" for the traffic lights 372, 382 given the detected state of "green" for the traffic light 376. That is, when the state of the traffic light 376 is "green," the interlocked state of the traffic lights 372, 382 is "red," and any vehicle seeking to turn right along either of the lane links 354, 368 would need to first stop at the traffic intersection and check for oncoming traffic before turning right. A final set of interlock rules represented in the example map format of FIG. 4 include "yield" interlock rules for the lane links 352, 358 based on the interlocked state of "green" for the traffic lights 370, 378 given the detected state of "green" for the traffic light 376. That is, when the state of the traffic light 376 is "green," the interlocked state of the traffic lights 370, 378 is also "green," and any vehicle seeking to turn left along either of the lane links 352, 358 would need to first yield to oncoming vehicles before turning left.

Though the example transition rules and interlock rules that are possible to guide vehicles through the traffic intersection based on the traffic signal types and traffic signal states described in reference to FIG. 4 reflect commonly understood traffic signals in the United States, other traffic signals types and traffic signal states are also possible that could influence the operation of the transition rules and the interlock rules.

Figure 5:
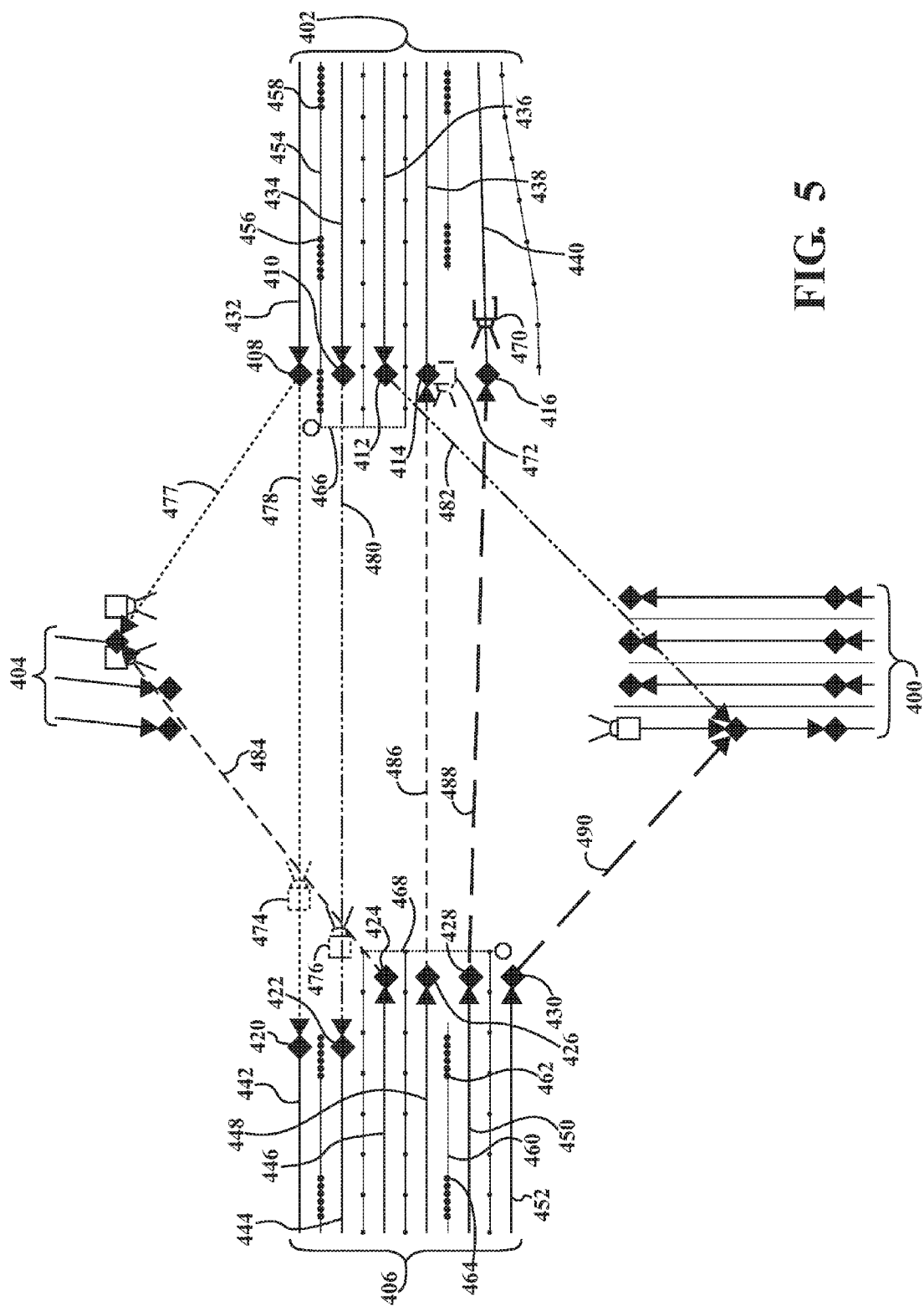
FIG. 5 shows an example two-dimensional representation of a portion of another four-way intersection as represented within a detailed map format for use with the autonomous vehicle of FIG. 2.

FIG. 5 shows an example two-dimensional representation of a portion of another four-way intersection as represented within a detailed map format for use with the autonomous vehicle 200 of FIG. 2. The intersection in this example map format also includes four branches 400, 402, 404, 406. The branches 402, 406 include five and six lanes, respectively, represented by waypoints 408, 410, 412, 414, 416, 420, 422, 424, 426, 428, 430 at the end of the lane segments 432, 434, 436, 438, 440, 442, 444, 446, 448, 450, 452. Only two of the branches 402, 406 are described for simplicity. Similar information as described above in reference to FIG. 3 is associated with the waypoints 408, 410, 412, 414, 416, 420, 422, 424, 426, 428, 430 shown in FIG. 4.

Each of the lane segments 432, 434, 436, 438, 440, 442, 444, 446, 448, 450, 452 within the branches 402, 406 can be further associated with borders formed of one or more border segments extending between at least two borderpoints. For simplicity, only a few of the border segments and borderpoints are numbered in the example map format shown in FIG. 4. For example, border segment 454 extends between borderpoints 456, 458 and border segment 460 extends between the borderpoints 462, 464. These border segments 454, 460 can be associated with the lane segments 432, 434 and the lane segments 448, 450, respectively. The border segments 454, 460 and borderpoints 456, 458, 462, 464 can be associated with various border types (e.g. solid lines and dashed lines) and border colors (e.g. white and yellow) for use in establishing driving rules to associate with the lane segments 432, 434, 448, 450. The use of driving rules applies while the autonomous vehicle 200 approaches the traffic intersection, but does not directly impact the various transition rules and interlock rules further described below.

FIG. 5 also shows additional features added to the map format in order to improve the map format for use with the autonomous vehicle 200 of FIG. 2. First, two of the lane segments 434, 436 are associated with a stop line 466 within branch 402 of the traffic intersection. The stop line 466 can be linked to the end of the lanes associated with the lane segments 434, 436 and information associated with the stop line 466 can include a geographical location of a position where the vehicle 200 must stop before the traffic intersection. In the example of FIG. 5, the stop line 466 extends between border segments associated with the lane segments 434, 436 and denotes the geographical location at which the autonomous vehicle 200 should be positioned if stopping in front of the traffic intersection. Another stop line 468 is also shown as associated with the three lane segments 446, 448, 450 within branch 406 of the traffic intersection.

The additional information provided by the stop lines 466, 468 is useful in operation of the autonomous vehicle 200 because the stop lines 466, 468 allow the autonomous vehicle 200 to be positioned at the traffic intersection in a manner consistent with manual operation of a vehicle. For example, if the autonomous vehicle 200 approaches the traffic intersection along the lane segment 434, instead of stopping at the waypoint 410 denoting the end of the lane segment 434, the autonomous vehicle 200 can be controlled to move forward to the stop line 466. This maneuver is more consistent with how a driver would manually operate a vehicle, for example, to pull forward to a designated location when stopping at a traffic intersection. Though not shown, crosswalks can also be included in the detailed map format in a manner similar to that used for the stop lines 466, 468. Information associated with the crosswalks can include a geographical location of a position of the crosswalk and a driving rule associated with the crosswalk that directs the automated vehicle system to implement additional safety protocols.

Traffic signals are also included in the map format shown in FIG. 5. As described above in reference to FIGS. 3 and 4, traffic signals can include information such as geographical location, traffic signal type, and traffic signal state. Traffic signal type can include information on the structure and orientation of a traffic light or traffic sign. Traffic signal structure and orientation for a traffic light can include "vertical three," "vertical three left arrow," "horizontal three," "right arrow," etc. Traffic signal state for a traffic light can include, for example, "green," "green arrow," "yellow," "blinking yellow," or "red." In the map format shown in FIG. 5, four traffic lights 470, 472, 474, 476 are labeled within the branches 402, 406 of the traffic intersection. As was described above in reference to FIGS. 3 and 4, each of the traffic lights 470, 472, 474, 476 can be associated with at least one lane link and a transition rule governing the operation of the autonomous vehicle 200 can be further associated with each lane link.

In FIG. 5, only eight lane links 477, 478, 480, 482, 484, 486, 488, 490 are labeled, those associated with the autonomous vehicle 200 exiting the branches 402, 406 of the traffic intersection. For example, the lane link 478 extends from the lane segment 432 to the lane segment 442. The operation of the autonomous vehicle 200 across this lane link 478 can be controlled, using a transition rule, based on the state of the traffic light 474 and is represented within the map format by using the same pattern for the lane link 478 as is used to display the traffic light 474. In another example, the lane link 486 extends from the lane segment 448 to the lane segment 438. The operation of the autonomous vehicle 200 across this lane link 486 can be controlled, again using a transition rule, based on the state of the traffic light 472 and is represented within the map format by using the same pattern for the lane link 486 as is used to display the traffic light 472.

In addition to including transition rules associated with the lane links 477, 478, 480, 482, 484, 486, 488, 490 and based on the state of the traffic lights 470, 472, 474, 476, the map format of FIG. 5 can include interlock rules inferred from the transition rules. For example, given the transition rule "go" associated with the lane link 480 that indicates that the autonomous vehicle 200 can proceed from the lane segment 434 to the lane segment 444 across the traffic intersection if the traffic light 476 has a state of "green," an interlock rule "go" can be inferred for the lane link 486 that other vehicles are also able to proceed from the lane segment 448 to the lane segment 438 across the traffic intersection since the traffic light 472 will have a state of "green" while the traffic light 476 has a state of "green." Again, interlock rules are based on the states of traffic signals that cannot be directly detected by the sensors 116 of the autonomous vehicle 200 using traffic operation rules based on the given structure of a traffic intersection.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is to be accorded the broadest interpretation so as to encompass all such modifications and equivalent structures as is permitted under the law.

What is claimed is:

1. A method of operating an autonomous vehicle approaching a traffic intersection, the method comprising:
   determining a current location of the autonomous vehicle;
   acquiring driving environment data using one or more sensors, the driving environment data including information about a traffic signal associated with a current travel lane of the autonomous vehicle;
   inputting the acquired driving environment data into a computer readable map format of the traffic intersection, the map format including:
      a plurality of lane segments, each lane segment associated with a branch of the traffic intersection;
      a plurality of lane links, each lane link associated with two of the plurality of lane segments and extending between two of the branches of the traffic intersection;
      a plurality of traffic signals, each traffic signal associated with at least one of the plurality of lane links;
      a transition rule associated with a first lane link, wherein the transition rule is based on information associated with the one of the plurality of traffic signals associated with the first lane link; and
      an interlock rule based on the acquired information about the traffic signal associated with the current travel lane of the autonomous vehicle, a state of one or more other traffic signals of the traffic intersection being inferred using the interlock rule, whereby the state of the one or more other traffic signals governs the actions of other vehicles across different lane links, the one or more other traffic signals being associated with a second lane link,
   wherein inputting the acquired driving environment data includes inputting the information about the traffic signal associated with the current travel lane of the autonomous vehicle for association with the one of the plurality of traffic signals associated with the first lane link, and applying the interlock rule based on the information about the traffic signal associated with the current travel lane of the autonomous vehicle to infer the state of the one or more other traffic signals associated with the second lane link;
   determining a driving maneuver for the autonomous vehicle relative to the traffic intersection using the map format and the determined current location of the autonomous vehicle; and
   causing the autonomous vehicle to implement the determined driving maneuver.

2. The method of claim 1, wherein the first lane link and the second lane link are associated with different traffic signals.

3. The method of claim 1, wherein the first lane link and the second lane link extend between different branches of the traffic intersection.

4. The method of claim 1, wherein the information associated with each traffic signal includes a geographical location and a traffic signal type and a traffic signal state.

5. The method of claim 4, wherein the traffic signal type includes information regarding structure and orientation for at least one of a traffic light and a traffic sign.

6. The method of claim 4, wherein the traffic signal type is a traffic light and the traffic signal state includes at least one of green, green arrow, yellow, blinking yellow, and red.

7. The method of claim 4, wherein the transition rule is based on the traffic signal state of the one of the plurality of traffic signals associated with the first lane link.

8. The method of claim 4, wherein the interlock rule is based on an inferred traffic signal state for the one of the plurality of traffic signals associated with the second lane link.

9. The method of claim 1, further comprising:
a stop line associated with an end of at least one of the plurality of lane segments, wherein information associated with the stop line includes a geographical location, the geographical location representing a position where a vehicle must stop before the traffic intersection.

10. The method of claim 1, wherein the traffic signal is a traffic light, wherein the information about the traffic signal associated with the current travel lane of the autonomous vehicle includes a color of the traffic light, and wherein inputting the acquired driving environment data includes inputting the color of the traffic light with the one of the plurality of traffic signals associated with the first lane link, and wherein the interlock rule is applied based on the color of the traffic light.

11. An autonomous vehicle system comprising:
one or more sensors configured to determine a current location of an autonomous vehicle and to acquire driving environment data using one or more sensors, the driving environment data including information about a traffic signal associated with a current travel lane of the autonomous vehicle sense the external environment of the vehicle;
processing unit, the one or more sensors being communicatively coupled to the processing unit; and
a memory communicatively coupled to the processing unit, the memory including a computer-readable map format, the map format including:
a plurality of lane segments, each lane segment associated with a branch of a traffic intersection;
a plurality of lane links, each lane link associated with two of the plurality of lane segments and extending between two of the branches of the traffic intersection;
a plurality of traffic signals, each traffic signal associated with at least one of the plurality of lane links;
a transition rule associated with a first lane link, wherein the transition rule is based on information associated with the one of the plurality of traffic signals associated with the first lane link; and
an interlock rule based on information associated with the one of the plurality of traffic signals associated with a second lane link,
an interlock rule based on the acquired information about the traffic signal associated with the current travel lane of the autonomous vehicle, a state of one or more other traffic signals of the traffic intersection being inferred using the interlock rule, whereby the state of the one or more other traffic signals governs the actions of other vehicles across different lane links, the one or more other traffic signals being associated with a second lane link,
the processing unit being configured to:
input the acquired driving environment data into the computer readable map format of the traffic intersection, wherein inputting the acquired driving environment data includes inputting the information about the traffic signal associated with the current travel lane of the autonomous vehicle for association with the one of the plurality of traffic signals associated with the first lane link, and applying the interlock rule based on the information about the traffic signal associated with the current travel lane of the autonomous vehicle to infor the state of the one or more other traffic signals associated with the second lane link;
determine a driving maneuver for the autonomous vehicle relative to the traffic intersection using the map format and the determined current location of the autonomous vehicle; and
cause the autonomous vehicle to implement the determined driving maneuver.

12. The system of claim 11, wherein the first lane link and the second lane link are associated with different traffic signals.

13. The system of claim 11, wherein the first lane link and the second lane link extend between different branches of the traffic intersection.

14. The system of claim 11, wherein the information associated with each traffic signal includes a geographical location and a traffic signal type and a traffic signal state.

15. The system of claim 14, wherein the traffic signal type includes information regarding structure and orientation for at least one of a traffic light and a traffic sign.

16. The system of claim 14, wherein the traffic signal type is a traffic light and the traffic signal state includes at least one of green, green arrow, yellow, blinking yellow, and red.

17. The system of claim 14, wherein the transition rule is based on the traffic signal state of the one of the plurality of traffic signals associated with the first lane link.

18. The system of claim 14, wherein the interlock rule is based on an inferred traffic signal state for the one of the plurality of traffic signals associated with the second lane link.

19. The system of claim 11, further comprising:
a stop line associated with an end of at least one of the plurality of lane segments, wherein information associated with the stop line includes a geographical location, the geographical location representing a position where a vehicle must stop before the traffic intersection.

20. The system of claim 11, wherein the traffic signal is a traffic light, wherein the information about the traffic signal associated with the current travel lane of the autonomous vehicle includes a color of the traffic light, and wherein inputting the acquired driving environment data includes inputting the color of the traffic light with the one of the plurality of traffic signals associated with the first lane link, and wherein the interlock rule is applied based on the color of the traffic light.

21. The system of claim 11, wherein one of the lane segments has at least two associated lane links.

\* \* \* \* \*

UNITED STATES PATENT AND TRADEMARK OFFICE
CERTIFICATE OF CORRECTION

PATENT NO. : 9,921,585 B2
APPLICATION NO. : 15/176903
DATED : March 20, 2018
INVENTOR(S) : Kentaro Ichikawa and Michael J. Delp It is certified that error appears in the above-identified patent and that said Letters Patent is hereby corrected as shown below:

Claim 11, Column 12, Line 20: delete "infor" and insert --infer--.

Signed and Sealed this
First Day of May, 2018

Andrei Iancu
*Director of the United States Patent and Trademark Office*